Jan. 2, 1968

C. L. DAVIS 3,361,076

EXPANSIBLE CHAMBER DEVICE

Filed May 6, 1966

INVENTOR
Carey L. Davis
Newton, Hopkins,
Jones & Ormsby

ATTORNEYS

Jan. 2, 1968  C. L. DAVIS  3,361,076
EXPANSIBLE CHAMBER DEVICE
Filed May 6, 1966  2 Sheets-Sheet 2

INVENTOR
Carey L. Davis
Newton, Hopkins,
Jones & Ormsby
ATTORNEYS

United States Patent Office 3,361,076
Patented Jan. 2, 1968

3,361,076
EXPANSIBLE CHAMBER DEVICE
Carey L. Davis, Atlanta, Ga., assignor of twelve and one-half percent each to William B. Pritchett, Jr., Stone Mountain, and Berthold G. Stumberg, Jr., George M. Eubanks, and Richard N. Lester, Atlanta, Ga.
Filed May 6, 1966, Ser. No. 548,197
9 Claims. (Cl. 103—161)

This application is a continuation-in-part of copending application Ser. No. 395,719, filed Sept. 11, 1964, now abandoned, for "Rotary Expansible Chamber Device."

This invention relates to an expansible chamber device, and more particularly to an expansible chamber pump or motor of the radiating vane type wherein a plurality of vanes radiating from a central axis are caused to rotate about the axis and reciprocate during their rotation to move, or be moved by fluid in the device.

Vane type motors or pumps have been found to be highly desirable in industry because of their smooth flow and high speed characteristics. The fluid motivating the motor or the fluid being pumped by the pump does not surge, as in the case of a piston machine, and the smoothness of operation of the various elements of the apparatus enables it to function at a relatively high speed. However, as in any high speed apparatus, care must be taken to insure that the moving elements of the apparatus are properly lubricated. Leakage of fluid from the apparatus also must be prevented.

Because of the high speed, high pressure and smooth operation characteristics of this type apparatus, care must be taken to assemble the various elements of the apparatus with great precision so that the elements coact with each other in precisely the manner planned and excessive wear and leakage within the apparatus are avoided.

In the past, lubrication of radial vane pumps or motors has been generally accomplished by routing some of the fluid from the apparatus to the bearing surfaces thereof, as by boring holes through various portions of the pump housing to lead the fluid to the bearing surfaces, or by routing some of the high pressure fluid exteriorly of the pump to a portion of the housing adjacent the bearings, and through the housing to the bearings. Of course, such an arrangement requires a plurality of sealing elements throughout various locations in the pump housing, and exteriorly of the pump housing, which is expensive to manufacture and maintain. The present invention accomplishes proper lubrication of the bearings and bearing surfaces of the apparatus by routing the fluid from the working chambers of the apparatus around the various internal components of the apparatus toward the bearings and bearing surfaces, which eliminates the requirement of the multiple number of seals formerly required in such a device. The arrangement of the lubrication of the bearings of the instant invention enables theh pump to be assembled wtih only a single sealing element, which is located exteriorly of the apparatus housing, where it is easily inspected and replaced from time to time.

Furthermore, the stator assembly of the instant invention which causes the reciprocation of the vanes, is constructed in two concentric sections that are relatively movable with respect to each other whereby the inner concentric section remains in alignment with the vanes and rotor of the pump while the other concentric section remains in alignment with the pump housing, regardless of the manner in which the pump housing and the remaining elements of the pump are assembled. With this construction, if the various elements of the apparatus are not precisely sized, or if they are not assembled with great precision, the concentric elements of the stator will allow for error in the assembly so as to avoid undue wear between the rotor, stator and vanes of the apparatus.

Also, the apparatus is provided with a means for removing the pressure built up by the lubricating fluid in the vicinity of the bearings of the apparatus so that excessive pressures will not be maintained within the pump housing that would ordinarily tend to exert forces on the elements of the apparatus and cause leakage of the fluid from the housing.

Accordingly, among the features of the present invention by which it may be distinguished from the multiplicity of prior art patents in this highly developed field is the simplicity of construction, the minimum number of parts present, the improved lubrication facilities, the relief of pressure from the lubricating fluid, the presence of only a single seal to prevent leakage from the housing of the apparatus, and the perpetual alignment of the elements of the apparatus in spite of the inaccuracy of the size of the elements or their improper alignment in assembly.

Thus, it is an object of this invention to provide an expansible chamber device of the type to be utilized as a pump or motor wherein improved lubrication features are present.

Another object of this invention is to provide an expansible chamber device of the radial vane type wherein only a single seal is required to prevent leakage from the various elements of the device.

Another object of this invention is to provide an expansible chamber device having a rotor mounted in a casing in a manner such that the rotor and casing are easily disassembled from each other.

Another object of this invention is to provide an expansible chamber device with means for removing excessive pressure from the lubricating fluid.

Another object of this invention is to provide an expansible chamber device of the rotary vane type, wherein the stator of said device is self-aligning.

Another object of this invention is to provide a rotary expansible chamber device that is simple in construction, contains a minimum number of parts, has improved lubrication facilities, has self-aligning elements therein, has means for removing the excessive lubricating fluid pressure, and is easily assembled or disassembled.

Other objects, features and advantages of the present invention will become apparent upon reading the following disclosure, taken in conjunction with the accompanying drawing, in which.

Figure 1:
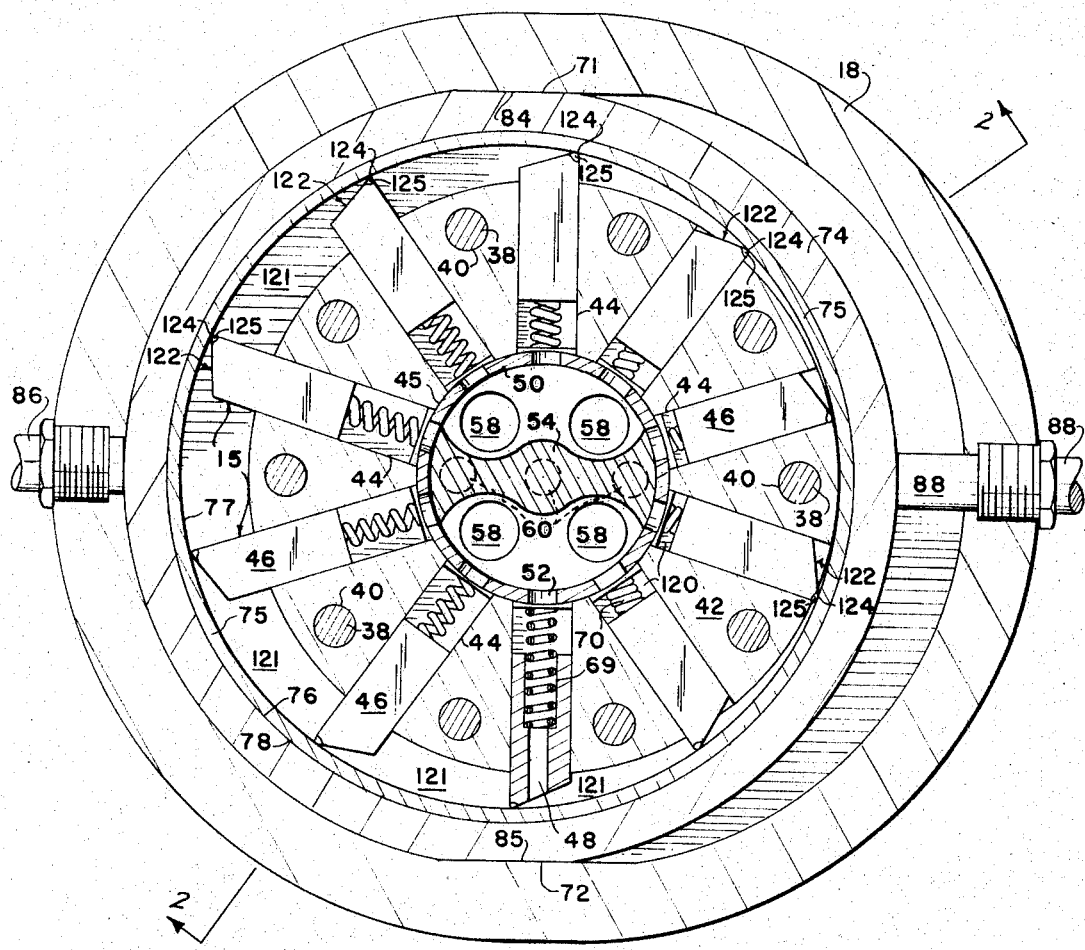
FIG. 1 is an end, cross-sectional view of the expansible chamber device.

Referring now more particularly to the drawing, in which like numerals indicate like parts throughout the several views, the pump or motor 10 will be referred to as a pump, although it should be appreciated that the device can function as a motor, as is characteristic of devices of this type. The pump 10 comprises a housing 11, rotor 12, stator assembly 14, a plurality of vanes 15 and a rotor shaft 16 extending from one end of the housing 11.

The housing 11 includes an annular stator support 18 disposed between a pair of end covers 19 and 20. The stator support 18 and the end covers 19 and 20 are connected to each other by means of bolts 21 extending through apertures 22 and 24 of the end covers 19 and 20, respectively, and through apertures 25 in the stator support 18.

The end covers 19 and 20 of the pump housing 11 are dished out in their interior portions to accompany the various elements of the pump. The end housings are dished out at 26 and 28 to accommodate rotor 12, and are dished at 29 and 30 to accommodate the bearings of the pump. End cover 19 of the housing 11 is centrally apertured at 31 to accommodate the rotor shaft 16 which extends outwardly of the internal portion of the housing 11. End cover 20 defines a pair of conduits 32 and 34 that open outwardly of the internal portion of the pump.

The rotor 12 of the pump 10 is formed in two pieces, a vane encompassing portion 35 and an end cover 36. The vane encompassing portion 35 of the rotor 12 includes rotor shaft 16 which is formed integrally therewith, and the end cover 36 is attached to the vane encompassing portion 35 by means of the cap screws 38 threaded through the apertures 39 of the end cover 36 into the threaded bores 40 of the vane encompassing portion of the rotor 12. The vane encompassing portion 35 includes an end flange 41 shaped in a manner similar to the shape of the end cover 36, whereby the end cover 36 and end flange 41 of the rotor extend radially outwardly of the main body portion 42 of the vane encompassing portion 35 of the rotor 12.

The main body portion 42 of the rotor 12 defines a series of radially extending slots 44 equally spaced therearound and a central bore 45 extending coaxially with the rotor shaft 16. The slots 44 extend from the outer periphery of the main body portion 42 of the rotor 12 to the bore 45, forming open communication between the bore 45 and the area outwardly of the rotor 12.

A plurality of vanes 15 are located in the housing 11, one vane 46 being located in each slot 44. The vanes 46 are generally rectangular in cross section and define a plurality of ports 48 extending throughout their entire length. While the vanes 46 fill the slots 44, the ports 48 maintain open communication between the bore 45 of the main body portion 42 and the area located outwardly of the main body portion.

A flow sleeve 50 is positioned in the bore 45, concentrically thereof, and attached to the end cover 36 of the rotor 12 by means of the cap screws 51. The flow sleeve 50 defines a plurality of aligned, radially extending open ports 52 in the vicinity of the main body portion 40 of the rotor 12. The flow sleeve 50 is positioned in the rotor 12 so that a row of ports 52 communicates with a slot 44 of the main body portion 40, to afford free communication between the interior area of the flow sleeve 50 and the slots 44.

A flow divider 54 is disposed centrally of the flow sleeve 50, and extends the entire length of the flow sleeve 50. The flow divider 50 extends the entire internal diameter of the flow sleeve 50 in one dimension, and defines a pair of flow areas 55 and 56 on each side thereof in another dimension, interiorly of the flow sleeve 50. The flow area 55 communicates at one end through a plurality of apertures 58 in flow divider 54 with the conduit 32, while the flow area 56 communicates through the plurality of similar apertures 58 with the conduit 34. The flow divider 54 is rigidly attached to the end cover 20 of the housing 11 by means of cap screws 60, so that the flow sleeve 50 and the remaining elements of the rotor 12 are free to rotate about the flow divider 54, that is; the flow areas 55 and 56 always communicating with their respective conduits 32 and 34.

The flow divider 54 is disc shaped at 61, its end remote from its attachment to the end cover 20 of the housing, and a roller bearing assembly 62 projects coaxially therefrom. The roller bearing assembly 62 includes a roller shaft 64 rigidly attached to the flow divider 54 and a plurality of roller bearings 65 circumferentially disposed thereabout. The bearings 65 are received in the bearing race 66 which is sized and shaped to be received in a counter bore 67 of the hollow area 68 of the rotor shaft 16. Thus, the rotor shaft 16 and the flow divider 54 are concentrically positioned with respect to each other by means of the bearing assembly 62.

The central port 48 of each vane 15 is counterbored at 69, and a vane spring 70 is received therein; the vane spring 70 bearing against the exterior surface of the flow sleeve 50. Since the central port 58 of each vane 15 is counterbored, the spring 70 will be maintained in its proper location in the central port, and central port will remain substantially open so that fluid can pass therethrough.

The stator support 18 of the housing 11 defines a pair of stator slides 71 on its internal surface; the stator slides being diametrically opposed from each other. The stator support 18 is generally elliptical in shape, the stator slides 71 and 72 forming the elongate portion of the ellipse. The stator assembly 14 is disposed inwardly of the stator support 18 and is generally circular in configuration. The stator assembly 14 comprises a pair of concentrically disposed outer and inner annular stator elements. The outer surface 76 of the inner stator element 75 is rounded in configuration, while the inner surface 78 of the outer stator element 74 is of complementary shape. The radius of curvature of the outer surface 76 of the inner stator element and its complementary inner surface 78 of the outer stator element is equal to the distance of the surfaces from the axis of rotation of the rotor 12. Thus, if the rotor 12 is cocked in position in the housing 11 so that it is not perfect alignment in the housing, the outer and inner stator elements 74 and 75 can move with respect to each other.

The outer stator element 74 is smaller in length along its central axis than the inner stator element 75. The stator support 18 is of equal length with the inner stator element 75 so that the stator support 18 holds the end covers 19 and 20 of the housing apart a distance greater than the length of the outer element 74, whereby gaps 79 and 80 are created on each side of the outer stator element 74, between the end covers 19 and 20. Furthermore, the length of the rotor 12, between the end flange 41 of the vane encompassing portion 35 of the rotor and the end cover 36 of the rotor is less than the interior area of the housing 11, between the end covers 19 and 20 thereof, so that gaps 81 and 82 are located between the rotor and its end covers.

The outer stator element 74 defines diametrically opposed flattened areas 84 and 85 located in the vicinity of the stator slides 71 and 72, whereby the stator assembly 14 is slidable on the stator slides 71 and 72, in the conventional manner, whereby the stator assembly can be offset from the center of the housing 11. Stator positioning elements 86 and 88, of conventional design, extend through the stator support 18 to engage the outer stator element 74 to position it within the stator support 18, along the slides 71 and 72. Of course, the positioning means 86 and 88 are adjustable to reposition the stator assembly in any desired location along the stator slides 71 and 72, to change the degree of eccentricity of the stator assembly with respect to the remaining elements of the housing 11 and rotor 12.

A rotor bearing assembly 89 is positioned in the end cover 19 of the housing 11, immediately inwardly of the central aperture 31 thereof. A second rotor bearing assembly 90 is similarly positioned in the end cover 20, immediately inwardly of the conduits 32 and 34. The rotor bearing assemblies 89 and 90 comprise shoulders 91 and 92, respectively, engaging the rotor shaft 16 and end cover projection 94, respectively, roller bearing races 95 and 96, and a plurality of roller bearings 98 and 99 disposed between the shoulders and bearing races, respectively. The shoulders and races are angled with respect to the axis of the rotor shaft 16, the axis of the bearings 98 and 99 being angled about the central area of the pump housing. Furthermore, the rollers 98 and 99 are tapered along their axes so that they are larger at their ends disposed nearest the central area of the pump housing.

With this construction it can be seen that any forces that tend to thrust the rotor 12 toward either end of the housing 11 will be resisted by the rotor bearing assemblies 89 and 90, the shoulders 91 and 92, respectively, tending to urge their respective rollers 98 and 99 against the inwardly sloped portion of the bearing races 95 and 96. Of course, the slope of the bearing races resists such thrust and tends to keep the rotor 12 centered in the housing 11. The gaps 81 and 82 on either side of the rotor 12, intermediate the rotor and the end covers 19 and 20 will, after initial operation of the pump, be filled with the fluid being acted on by the pump due to the natural leakage of the fluid around the various elements of the pump. The presence of the fluid in the gaps 81 and 82 further tends to position the rotor 12 centrally of the housing 11. The fluid in the gaps 81 and 82 also tends to lubricate the bearing assemblies 89 and 90.

A shaft seal 100 is positioned about the rotor shaft 16, adjacent the end cover 19 of the housing 11 to seal the fluid within the housing. The shaft seal 100 is maintained in proper position by the seal retainer 101 which is attached to the end cover 19 by means of cap screws 102. The seal 100 prevents the fluid from inside the housing 11 from leaking along the rotor shaft 16.

End cover 20 of the housing 11 defines an aperture 104 leading outwardly from the gap 28 between the end cover 36 of the rotor 12 and the interior portion of the end cover 20 of the housing 11. A conduit 105 is connected to the aperture 104, and leads to a T connection 106. The T connection 106 is connected to a pair of conduits 108 and 109 which lead to, and communicate with the conduits 32 and 34, respectively, of the housing 11. Check valves 110 and 111 are located in the conduits 108 and 109, respectively, which limit the direction of fluid flow through the conduits 108 and 109 from the interior portion of the housing toward the conduits 32 and 34. With this construction, when the lubricating liquid pressure within the housing 11 of the pump reaches a predetermined level, the check valves 110 or 111 will open to allow the fluid to drain away from the pump housing, and into one of the conduits 32 or 34. If the conduit 34 is the high pressure conduit, depending upon the direction of rotation of the rotor, the lubricating fluid from the housing will drain through conduit 108 to conduit 32. Of course, the opposite arrangement would be in effect if conduit 32 were the high pressure conduit of the pump. Because of the gaps 79, 80, 81 and 82 disposed between the housing 11 and the rotor and stator assembly, there is substantially free communication of the lubricating fluid with the surfaces of the pump between which exists relative rotation. The lubricating fluid is capable of communicating across the breadth of the pump to equalize itself, so that substantially equal pressures exist in the gaps 79, 81 and 80 and 82. Of course, this tends to position the rotor 12 and the outer stator element 74 centrally of the housing 11.

The rotor shaft 16 is hollow, and its outer portion 112 is internally threaded at 114. The outer diameter of the rotor shaft 16 is exteriorally splined at 115 so as to receive a driving element 116. The driving element 116 can be a gear, sprocket, pulley or any other type conventional driving element. The driving element can be positioned on the rotor shaft 16 by engaging complementary splines thereof with the splines 115 of the rotor shaft, and a retaining cap 118 which overlaps the splined portion of the rotor shaft can secure the driving element 116 on the rotor shaft by being threaded into the internal threaded portion 114 of the rotor shaft.

*Operation*

Figure 2:
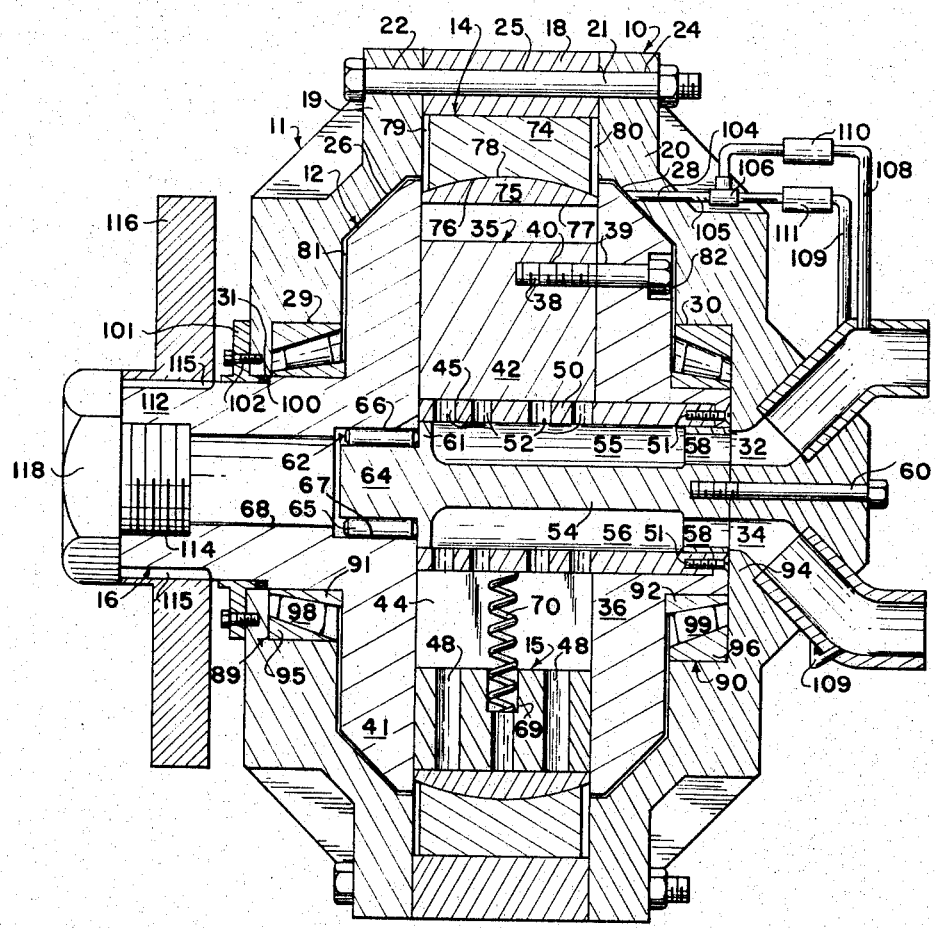
FIG. 2 is a side, cross-sectional view of the expansible chamber device, taken along lines 2—2 of FIG. 1.

When operating the pump, the stator assembly 14 is offset from the axis of the rotor 12 by manipulation of the adjusting means 86 and 88 (FIG. 2) so that the vanes 46 of the rotor 12 project further outwardly of the vane encompassing portion 35 of the rotor on one side of the pump than they do on the opposite side. The rotor shaft 16 of the pump 10 is then rotated by engaging a driving means with the driving element 116, and the rotor 12 is rotated in the conventional manner. The vanes 46 are caused to reciprocate in their slots 44 since their respective springs 70 urge them into engagement with the interior surface 77 of the inner stator element. As the rotor 12 rotates about the stator assembly and the vanes 46 reciprocate in their slots 44, fluid is drawn in through conduit 34 of the end cover 20, through the apertures 58 of the flow divider 54 into the flow area 56, and through the apertures 52 of the flow sleeve 50. As the vanes 46 move outwardly of the vane encompassing portion 35 of the rotor 12, a space is created between the vane encompassing portion 35 and the inner stator element 75, and a space is created between the innermost end of the vanes 46 and the flow sleeve 50. These expanding areas create a space for the fluid to flow to, creating a vacuum inside the pump whereby the atmospheric pressure outside the pump to force the fluid into these newly created spaces. Of course, the ports 48 extending through the vanes 46 allow the fluid to flow from the flow area of the flow sleeve 50 into the space 120 created between the vanes 46 and the flow sleeve 50, and through the vanes to the space 121 created between the vanes 46 and the interior stator ring 75. As the rotor continues to rotate in the stator assembly 14, these spaces 120 and 121 continue to expand, which continues to draw fluid into the pump, until the "bottom dead center" position of the vanes is reached, whereupon the vanes begin to be pushed back toward the axis of the rotor by the interior stator element 75. Of course, this begins to reduce the areas 120 and 121 previously created in the pump so that the fluid introduced to these areas is caused to flow back through the ports 48 of their various respective vanes 46, through the apertures 52 of the flow sleeve 50 into the flow area 55, through the ports 58 of the flow divider 54, and through the conduit 32 of the end cover 20 of the pump housing 11.

As is best shown in FIG. 1, the outer ends 122 of the vanes 46 are angled so that only the pointed edge 124 of each of the vanes engages the inner stator element 75. The pointed edge of each of the vanes is equipped with a hardened substance 125 that is resistant to wear and heat so that the vanes will not rapidly deteriorate upon extended use. Also, the ports 48 of the vanes 46 communicate with their respective areas or pumping chambers 121 behind the hardened areas 125. The slope of the ends of the vanes 46 allows free communication through the vanes.

The rotor bearing assemblies 89 and 90, having the tapered roller bearings 98 and 99, respectively, angled with respect to the axis of the rotor 12 are effective to absorb end thrust exerted on the rotor so that the end flange 41 of the vane encompassing portion 35 of the rotor 12 and the end cover 36 of the rotor 12 do not tend to bind against and wear on their respective end covers 19 and 20. Also, the bearing assemblies tend to maintain a gap between the rotor and the end covers so that the fluid being motivated by the pump, by natural attrition through the various components of the pump, migrates to the bearing assemblies, thereby lubricating the bearing assemblies. In the event that the pressure of the lubricating fluid builds up to a danger point within the pump housing, thereby causing some leakage of the lubricating liquid by the shaft seal 100, or tending to force the elements of the pump housing apart to leak liquid past these elements, the check valves 110 and 111 are effective to drain the lubricating fluid away from the pump housing. The check valves 110 and 111 are set so that they will be effective to drain the lubricating fluid from the pump housing only after a predetermined pressure has been reached.

The outer stator element 74, being of a smaller thickness than either the stator support 18 or the inner stator element 75, is free to some extent to shift within the housing 11, about the inner stator element 75. Accordingly, if the elements of the pump housing or pump rotor were improperly assembled, or if these elements were not manufactured to the precise dimensions as usually required in a pump of this type, the inner stator element 75 can move with respect to the outer stator element 74 so that the rotor and stator can be improperly assembled without detrimental effects to the operation of the pump or the length of time in which the elements of the pump will withstand normal wear.

The particular position of the shaft seal 100 about the rotor shaft 16 is such that it is easily checked for leakage and upon discovering leakage through the seal can be expediently replaced. Furthermore, the simple construction of the seal and the seal retainer is such that they are inexpensive to manufacture and expedient to replace.

The positioning of the flow divider bearing assembly 62 within the rotor 12 is such that the flow divider 54 and the flow sleeve 50 will always be maintained centrally of the rotor 12. This accurate positioning of the flow sleeve and flow divider in this manner insures that the areas or pumping chambers 120 created between the vanes 46 and the flow sleeve 40 are of uniform dimension. Furthermore, stability is provided to the flow sleeve 50 and the flow divider 54 by the bearing assembly 62 at the end of these elements remote from the end cover 20 of the pump housing 11. Thus, these elements can be constructed of relatively thin material, without regard to the stresses normally placed on these elements in the conventional pump design.

It will be obvious to those skilled in the art that many variations may be made in the embodiments chosen for the purpose of illustrating the present invention without departing from the scope thereof as defined by the appended claims.

What is claimed as invention is:

1. An expansible chamber device including:
   a housing,
   a rotor disposed within said housing and defining a central opening and a plurality of radially extending slots extending between said opening and the outer annular surface of said rotor,
   a vane positioned in each of said slots,
   a flow sleeve positioned in said central opening and arranged to rotate with said rotor, said flow sleeve defining a plurality of ports uniformly disposed about its circumference and about at least a portion of its length, said ports communicating the area internally of said sleeve with said slots,
   a flow divider positioned within said flow sleeve, said flow divider being connected to said housing,
   an inner stator means surrounding at least a portion of said rotor, said vanes slidably engaging said inner stator means, the exterior surface of said inner stator means being of convex annular configuration,
   an outer stator means disposed about said inner stator means and defining an internal surface of concave annular configuration complementary to the exterior surface of said inner stator means,
   the dimension of said outer stator means corresponding to the direction of the axis of rotation of said rotor being smaller than the corresponding dimension of said inner stator means,
   the radius of curvature of the convex and concave surfaces of said inner and outer stator means being substantially equal to the radius between the centers of said inner and outer stator means and said surfaces,
   said housing including a plurality of frustoconical roller bearings disposed on opposite sides of said roller, the axes of rotation of said bearings being disposed at an angle with respect to the axis of rotation of said rotor, and
   means for venting any fluid attaining a predetermined pressure from said housing.

2. In an expansible chamber device including a casing, a rotor defining a plurality of generally radially extending slots, stator means within the casing surrounding said rotor, and a vane slidably positioned in each of the slots, the improvement therein of the stator means comprising an outer stator member slidably mounted in the casing defining a concave annular inner surface, an inner stator member mounted within the outer stator member and about the rotor and defining a convex annular outer surface conforming in shape to the shape of and engaging the inner surface of the outer stator member, the inner stator member being freely rotatable with the rotor and with respect to the outer stator element, and the curvature of the concave annular inner surface of the outer stator member and of the convex annular outer surface of the inner stator member being of a radius such that the inner stator member is pivotal with respect to the outer stator member.

3. In an expansible chamber device including stator means, a rotor positioned within said stator means defining a plurality of radially extending openings, plunger means slidably received in said openings and adapted to be urged against said stator means, the improvement therein of said stator means comprising an inner stator element of annular configuration and an outer stator element of annular configuration surrounding said inner stator element, wherein said outer stator element and said inner stator element are constructed and arranged to pivot with respect to each other, and said inner stator element is free to rotate with said rotor and with respect to said outer stator element.

4. An expansible chamber apparatus comprising a housing, a rotor rotatably received within said housing and defining a plurality of generally radially extending slots and flange members disposed on each side of said slots, a first stator member rotatable with said rotor surrounding said slots and positioned between said flange members, said first stator member defining a convex annular exterior surface extending from one of said flange members to the other of said flange members with the edges of said first stator member being of smaller diameter than and positioned within the peripheries of said flange members, a second stator members slidably engaging said housing and surrounding said first stator member and defining a concave annular interior surface engaging the convex annular exterior surface of said first stator member, said second stator member defining on each side thereof with each of said flange members and said housing an annular space.

5. The invention as claimed in claim 2 wherein the radius of curvature of the convex outer surface of said inner stator element is approximately equal to the longest radius from the longitudinal axis of said inner stator element to said surface.

6. The invention as claimed in claim 2 wherein the dimension of said inner stator element in the direction of the axis of rotation of said rotor is greater than the corresponding dimension of said outer stator element.

7. The invention as claimed in claim 2 wherein the dimension of said outer stator element along the axis of rotation of said rotor is less than the corresponding dimension of said vanes.

8. In an expansible chamber apparatus including stator means, a rotor positioned within said stator means and defining a plurality of generally radially extending passages, and plunger means slidably positioned in each of the passages, the improvement therein of said stator means comprising:
   a circular inner stator element surrounding the rotor of a dimension along the axis of rotation of the rotor approximately equal to the dimension of said plunger means along said axis, and defining a cylindrical inner surface and a convex annular outer surface, and
   a circular outer stator element surrounding the inner stator element and movable across the axis of rotation of said rotor, said outer stator element being of a dimension along the axis of rotation of the rotor less than the dimension of said plunger means along said axis, and defining a concave annular inner surface in engagement with the freely rotatable and pivotal with respect to the convex annular outer surface of said inner stator element.

9. The invention of claim 8 wherein said rotor includes a central portion and annular flanges extending radially outwardly from each end of said central portion, and said inner stator element extending about said central portion between said flanges.

References Cited

UNITED STATES PATENTS

| | | | |
|---|---|---|---|
| 1,807,392 | 5/1931 | Davis | 103—136 |
| 2,049,092 | 7/1936 | Sturm | 103—121 |
| 2,393,773 | 1/1946 | Hoffer | 103—161 |
| 2,658,456 | 11/1953 | Wahlmark | 103—121 X |
| 3,111,905 | 11/1963 | Eichmann | 103—120 |
| 3,230,840 | 1/1966 | Hanson | 103—136 |

FOREIGN PATENTS

| | | |
|---|---|---|
| 565,930 | 12/1951 | Canada. |
| 816,379 | 4/1937 | France. |
| 894,202 | 10/1953 | Germany. |
| 493,577 | 10/1938 | Great Britain. |

DONLEY J. STOCKING, *Primary Examiner.*

MARK NEWMAN, WILLIAM L. FREEH, *Examiners.*

R. M. VARGO, *Assistant Examiner.*